No. 868,050. PATENTED OCT. 15, 1907.
F. M. WIDERMAN.
CUTTING MECHANISM FOR CORN HARVESTERS.
APPLICATION FILED NOV. 7, 1905.
2 SHEETS—SHEET 1.
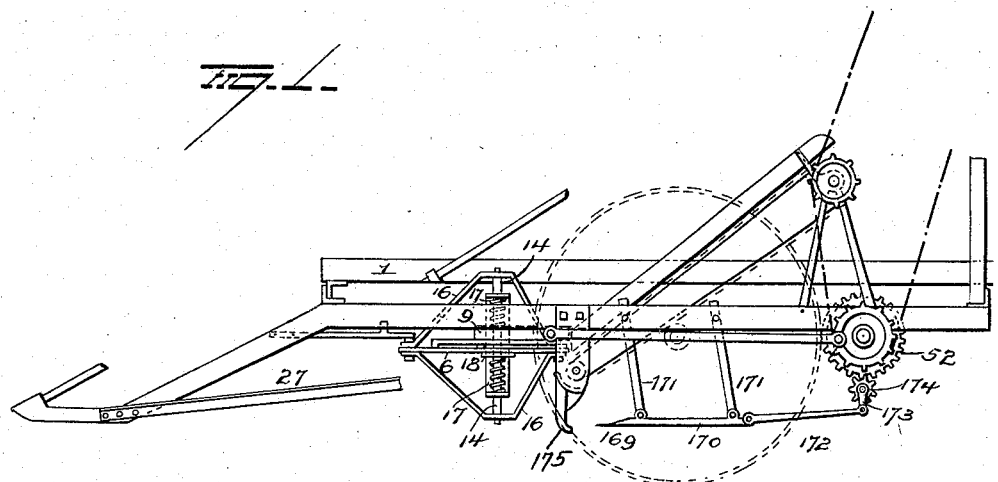
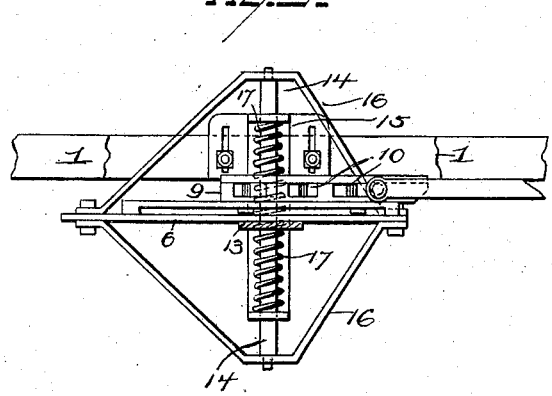
WITNESSES
INVENTOR No. 868,050. PATENTED OCT. 15, 1907.
F. M. WIDERMAN.
CUTTING MECHANISM FOR CORN HARVESTERS.
APPLICATION FILED NOV. 7, 1905.
2 SHEETS—SHEET 2.
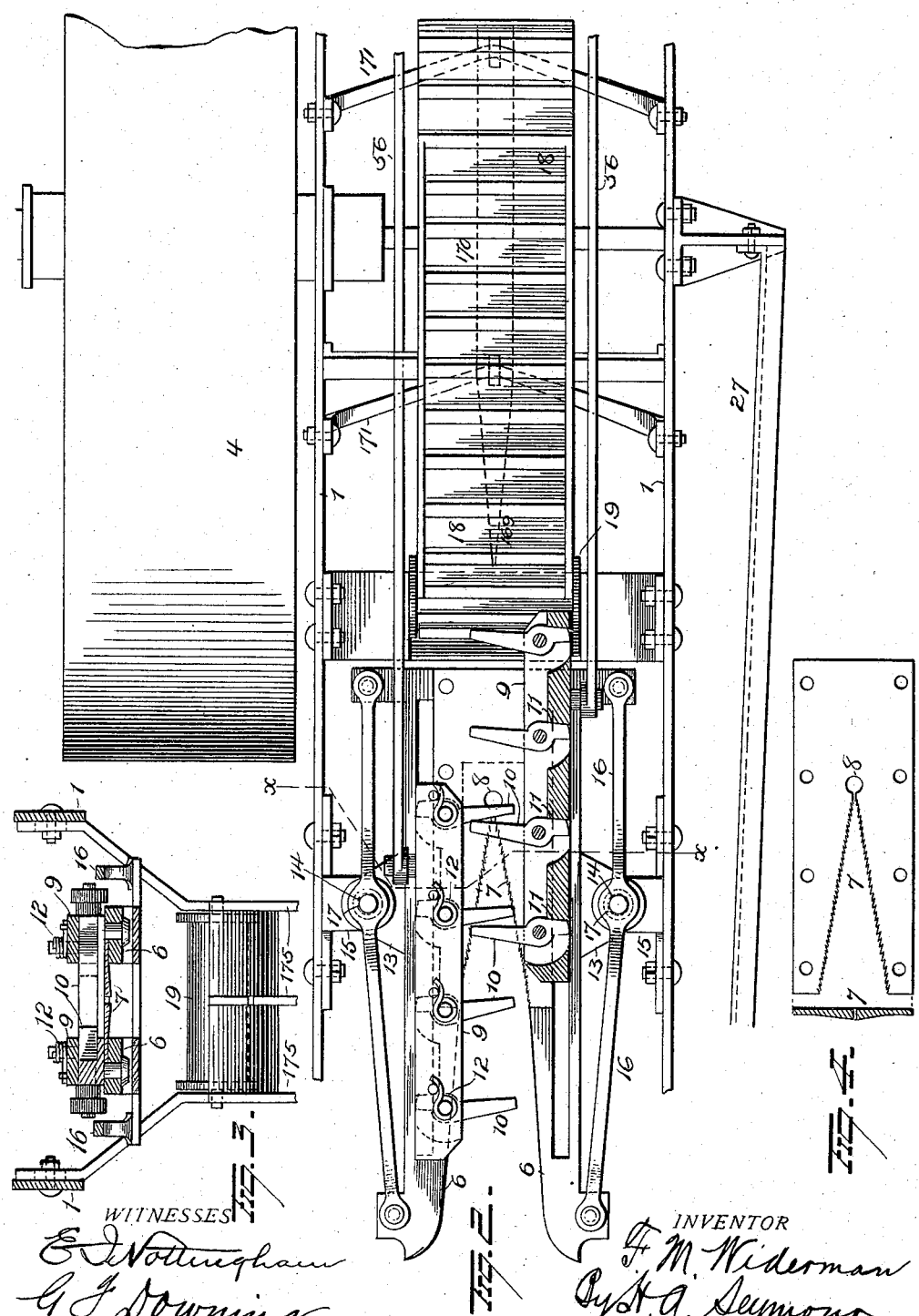
WITNESSES
INVENTOR
F. M. Widerman
Attorney

UNITED STATES PATENT OFFICE.

FRANCIS M. WIDERMAN, OF HARRISON, NEW JERSEY.

CUTTING MECHANISM FOR CORN-HARVESTERS.

No. 868,050. Specification of Letters Patent. Patented Oct. 15, 1907.

Original application filed August 19, 1904, Serial No. 221,393. Divided and this application filed November 7, 1905.
Serial No. 286,250.

*To all whom it may concern:*

Be it known that I, FRANCIS M. WIDERMAN, a resident of Harrison, in the county of Hudson and State of New Jersey, have invented certain new and useful Improvements in Cutting Mechanism for Corn-Harvesters; and I do hereby declare the following to be a full, clear, and exact description of the invention, such as will enable others skilled in the art to which it appertains to make and use the same.

My invention relates to improvements in cutting mechanism for corn harvesters, and is a division of my application for improved corn harvester and shocker, filed August 19, 1904, Serial No. 221,393, the object of the invention being to provide improved mechanism for cutting the stalks, and cutting the stubble, and improved mounting for the cutters, and with these objects in view, the invention consists in certain novel features of construction and combinations and arrangements of parts as will be more fully hereinafter described and pointed out in the claims.

In the accompanying drawings, Figure 1 is a fragmentary view in side elevation illustrating my improvements. Fig. 2 is an enlarged plan view. Fig. 3 is a view in section on the line x—x of Fig. 2. Fig. 4 is a view of the main cutter removed and Fig. 5 is a view of the cutter mounting.

1 represents the frame of a machine, and at one side thereof, my improved cutter frame 6 is secured and has secured thereon, a cutter plate 7, having a V-shaped recess therein to receive and cut the stalks as the machine moves over the ground. This cutter is made thickest at its center and tapers to its edges and has an opening 8 at the point of the V-shaped recess to prevent the accumulation of material at this point and the clogging of the cutter, and the walls of the V-shaped recess are notched, forming forwardly projecting teeth.

Mounted to reciprocate longitudinally on the cutter frame 6, are slide bars 9 carrying fingers 10 normally held at right angles to the bars and projecting toward each other, and are held against stops or shoulders 11 on the bars 9, by coiled springs 12, located on the pivot pins of said fingers. The fingers 10 move back and forth over the V-shaped cutting recess of plate 7, and serve to hold the stalks upright in position to be cut and not knocked over by the advancing cutter and owing to the pivoting of the fingers they are free to swing during their outward movement to pass the rearwardly moving fingers on the opposite side, and the stalks held thereby.

To permit elastic up and down movement of the cutter plate, and prevent breaking of the plate or injury to the machine, should the traction wheels fall into a depression or ride over a hill while the cutter is partially through a stalk, the cutter frame 6 is provided at opposite sides with perforated lugs 13 to receive bolts or rods 14, which also pass through brackets 15 having slot and bolt connection with bars 1, to permit adjustment of the cutter up and down. Braces 16 connect the ends of the rods 14 with cutter frame 6 and coiled springs 17 are located on said rods 14 and bear at their respective ends against the brackets 15 and lugs 13 to normally hold the cutter frame and cutter stationary, yet permit of up and down movement thereof to insure a thorough cut of the cutter after once entering a stalk, regardless of the uneven condition of the ground over which the machine is passing.

As will be seen by an examination of the drawings, the cutter 7 severs the stalks some distance above the ground and to cut off this long stubble, a cutter 169 is provided and consists of a thin sheet of steel secured to a longitudinal bar 170 mounted to swing on links 171 and connected by a pitman 172 with a crank arm 173 on a shaft carrying a gear 174 meshing with and driven by, gear 52, to reciprocate the cutter 169 and cut the stubble any height desired, the links 171 having adjustable connection with the machine frame. The cutter is prevented from striking a stone, or other obstruction by depending guard fingers 175, as clearly shown in Fig. 1.

A great many slight changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. The combination with a harvester, of a cutter plate thickened along its central longitudinal portion, said thickened portion having a V-shaped recess and the walls of said recess having teeth.

2. The combination with a harvester, of a cutter plate thickened along its central longitudinal portion said thickened portion having a V-shaped recess, and the walls of said recess having forwardly projecting teeth.

3. In a harvester, the combination with a machine frame, of a vertically movable cutter frame, a cutter fixed to said cutter frame, and springs disposed above and below the cutter frame, and between said cutter frame and the machine frame.

4. In an apparatus of the character described, the combination with a machine frame, of a cutter frame a fixed cutter thereon, brackets adjustably secured to the machine frame, rods located in said brackets, ears on the cutter frame mounted on the rods, and springs on the rods above and below the ears.

In testimony whereof, I have signed this specification in the presence of two subscribing witnesses.

FRANCIS M. WIDERMAN.

Witnesses:
GEORGE V. HEADLEY,
THOS. B. GALE.